United States Patent [19]
Magnan

[11] Patent Number: 5,275,117
[45] Date of Patent: Jan. 4, 1994

[54] FLEXIBLE WING SHAPE CONTROLLING DEVICE

[76] Inventor: Jeffrey J. Magnan, 33692 Calle De Bonanza, San Juan Capistrano, Calif. 92675

[21] Appl. No.: 900,193

[22] Filed: Jun. 17, 1992

Related U.S. Application Data

[63] Continuation-in-part of Ser. No. 727,070, Jul. 9, 1991, abandoned.

[51] Int. Cl.$^5$ .................................. B63H 9/04
[52] U.S. Cl. .................................. 114/108; 114/39.1; 114/102
[58] Field of Search ...... 114/39.1, 39.2, 102–109, 111; 441/65, 74; 244/123, 124, DIG. 1

[56] References Cited

U.S. PATENT DOCUMENTS

| | | | |
|---|---|---|---|
| 4,064,821 | 12/1977 | Roberts | 114/103 |
| 4,625,672 | 12/1986 | Jackson | 114/108 |
| 4,686,921 | 8/1987 | Magnan | 114/102 |
| 4,708,079 | 11/1987 | Magnan | 114/103 |
| 4,766,831 | 8/1988 | Johnson | 114/103 |
| 4,856,447 | 8/1989 | Magnan | 114/103 |
| 5,065,685 | 11/1991 | Stevenson | 114/102 |

*Primary Examiner*—Robert J. Oberleitner
*Assistant Examiner*—Clifford T. Bartz
*Attorney, Agent, or Firm*—Fulwider Patton Lee & Utecht

[57] ABSTRACT

A tensioner for drawing a point on a flexible wing's surface toward its leading edge. The wing's camber is thereby increased and maintained even at high airflow velocities and low angles of attack. The provision of a tensioner length adjustment system allows the wing's camber to be optimized for a particular set of conditions. The fitment of a plurality of such tensioners along the wing's chordlines and along its span allows the wing's shape to be fine-tuned both in terms of camber as well as twist.

10 Claims, 8 Drawing Sheets

FLEXIBLE WING SHAPE CONTROLLING DEVICE

This is a continuation-in-part of copending application Ser. No. 07/727,070, filed on Jul. 9, 1991, now abandoned.

BACKGROUND OF THE INVENTION

1. Field of the Invention

The present invention relates generally to flexible wings used on various craft for lift or propulsion and more particularly pertains to devices for modifying and controlling the shape of such wings in order to increase power and enhance stability and control.

2. Description of the Prior Art

The efficiency and controllability of an aerodynamic surface is extremely sensitive to relatively minor changes in its shape. Moreover, shape requirements change as a function of airflow velocity and angle of attack. The problem of achieving an optimized shape is compounded in flexible wing designs wherein both surfaces are called upon to interchangeably fulfill windward as well as leeward functions.

Flexible wings are commonly utilized on sailing craft and a large variety of equipment and techniques has been developed to either directly or indirectly control the shape of the sail. The cut of the sail along with the type of materials utilized in its construction have a fundamental effect on the sail's ultimate shape while additional devices such as booms, sprits, spars, gaffs, outhauls, downhauls, boomvangs, etc. are utilized to modify the shape of the sail in order to accommodate various conditions. Relatively recent advances exploit the flexibility of specially constructed mast systems to further help shape the sail.

Two parameters that relate directly to a sail's shape and hence performance, are camber and twist. Camber refers to the convexity, arching or curving of the sail's surface relative the chord. The sail's camber, both in terms of shape and thickness, affects the range of angle of attack in which the sail can generate lift. The magnitude of the greatest deviation of the sail surface from the chord is a critical factor as is the point along the chord at which the greatest such deviation occurs. These two aspects of camber along with the profile of the "entry curve" of the sail's leading edge and the taper of the sail's trailing edge all affect the amount of power a sail is capable of extracting from air flowing thereover and the angles of attack at which such power can be extracted. Additionally, the sail's camber shape influences the boom center of pressure (bcp). The specific location of the bcp affects the control of the craft powered by the sail, while a shifting bcp causes instability. Due to the flexible nature of a conventional sail, varying magnitudes of airspeed and angle of attack typically alter the camber shape with a commensurate shift in the bcp.

The term "twist" is used to describe any variation in the angle with which the sail's chordlines emanate from along its leading edge. A chordline's orientation determines the angle of attack and while a substantial angle of attack may be necessary in order to extract power from an impinging air flow, too large an attack angle near a sail's head generates a disruptive and drag inducing vortex. It is therefore desirable to induce twist in the sail such that the angle of attack is greatest in the sail's "working section" (the bottom third to one half) while tapering off to near zero at its head. Twist additionally affects the spanwise center of pressure (scp). In a fashion similar to the bcp, the scp affects the control and stability of the craft powered by the sail.

Applicant has previously developed various "camber inducing devices" (see U.S. Pat. Nos. 4,686,921; 4,708,079; and 4,856,447) that serve to modify the shape of the sail by directly coupling a sail's battens with the mast. The couplings prevent undesired forward movement of the battens around the sides of the mast with the easing off of the outhaul in an effort to increase camber and thereby prevent the leading ends of the battens from distorting the airfoil shape and disrupting airflow. While those disclosed systems afford certain control of the sail's shape, their capabilities fall far short of maintaining an optimal airfoil shape, particularly at high airspeed and low angles of attack. Additionally, the amount of camber induced by such systems is inextricably tied to the adjustment of the outhaul and downhaul. Furthermore, these prior art devices are unable to provide the capability of independently varying the camber along the sail's span and similarly are incapable of altering the sail's twist. Finally, the prior art devices are unable to prevent decambering of the sail at low angles of attack and high wind velocities.

SUMMARY OF THE INVENTION

The present invention overcomes the shortcomings of the prior art to provide a simple device with which a sail's camber is readily modifiable and which serves to positively maintain a selected amount of camber in a sail despite low angles of attack and high airspeeds. Camber is alterable substantially independently of the outhaul tension and manipulation of the device not only enables the amount of power extracted from the wind to be maximized, but allows the bcp and scp to be properly positioned and maintained in such position to enhance control and stability. By fitting a plurality of the present invention's devices to a sail, the camber profile can be fine tuned along the chordlines as well as along the span and thereby additionally allows the sail's twist to be modified and fine-tuned. The present invention enables wind propelled watercraft to achieve substantially higher speeds and operate at substantially higher pointing angles, while rendering the craft substantially more stable and controllable than heretofore possible.

The present invention consists of a device that positively limits to a preselected distance the separation between a preselected attachment point on the sail's surface and the sail's leading edge. The device allows such separation to be constrained to less than the reach of the sail material therebetween. Airflow impinging on the sail causes the attachment point to swing slightly to the lee and slightly forward and thereby defines the point of maximum camber as well as the maximum thickness of the airfoil shape. The sail material forward of the attachment point billows to form as a well-controlled entry curve. The selected attachment point and separation distance determines the sail surface's maximum deviation from the chordline, the maximum deviation's position along the chordline, the profile of the entry curve all of which affect the location of the bcp. The positive linkage between the leading edge and attachment point prevents decambering and which would force the bcp aft at high airspeeds and low angles of attack. Power is thereby maintained and a destabilizing shifting of the bcp is prevented. On the other hand, under conditions wherein a sudden gust would otherwise overpower a sail and would require an immediate sheeting out in an attempt to remain upright, the device of the present invention allows that portion of the sail aft of the attachment point to reflex with a minimal shift of the bcp.

The present invention further provides for the adjustability of the tensioning device such that the maximum separation distance can be altered. Alternative embodiments further incorporate the capability to altogether disable the tensioning device an optionally provide for the automatic disabling of the tensioning device with each tack. Fitment of a plurality of such tensioning devices along a chordline allows the full length of the airfoil shape to be precisely controlled. While adjustment of a single such tensioning device can have some effect on the scp and the sail's twist, fitment of a plurality of such devices along the sail's span provides a considerable amount of control of both scp and twist.

In its simplest form, the device according to the present invention consists of a strap that is securely attached at one end to the sail's surface, looped around forward of the mast and attached at its other end to the sail's opposite surface at point directly adjacent the first end's attachment point. The length of the strap is selected such that the sail material forward of the attachment points is forced to curve and/or maintain such curvature. The strap is free to slide around the mast such that the sail can fill or rotate towards either side depending on wind direction whereby the strap shifts to reduce its windward length while increasing its leeward length.

The inclusion of length adjustment means are preferred such that varying amounts of camber can be imparted to the sail. A buckling mechanism near either or both attachment points readily provides for such adjustment while a more complex routing of the strap provides a more convenient remote adjustment capability. In an alternative embodiment, an appropriately positioned, tabbed buckles serve to release all tension with each tacking maneuver.

The attachment points are preferably positioned near the forward ends of a batten, preferably to the batten pocket or actually to the batten itself. In a fully battened sail design, the tensioning strap of the present invention is alternatively routed around the forward end of the batten behind the mast. Sail designs with a large luff pocket allow the tensioning strap to be routed internally.

Alternatively, the tensioning strap is securely attached near the luff while being free to shift through the sail and batten at a point aft the luff. Further alternate embodiments provide the strap in the form of a closed loop which is free to shift toward either side of the sail at both forward as well as aft ends.

Other features and advantages of the present invention will become apparent from the following detailed description, taken in conjunction with the accompanying drawings, which illustrate by way of example, the principles of the invention.

DETAILED DESCRIPTION OF THE PREFERRED EMBODIMENTS

Figure 1:
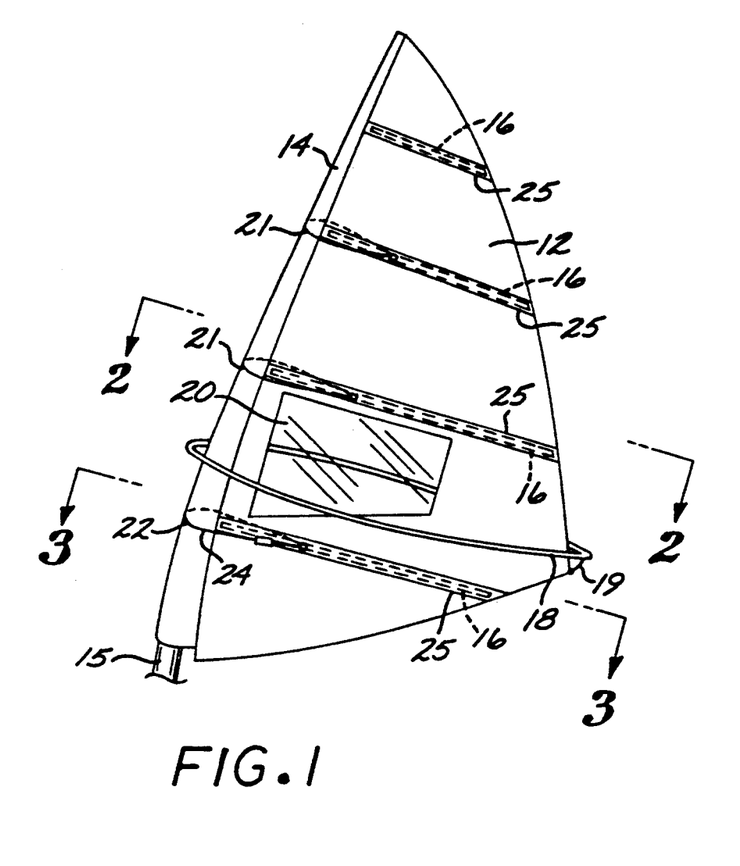
FIG. 1 is a perspective view of a sail incorporating shape controlling devices of the present invention.
Figure 12:
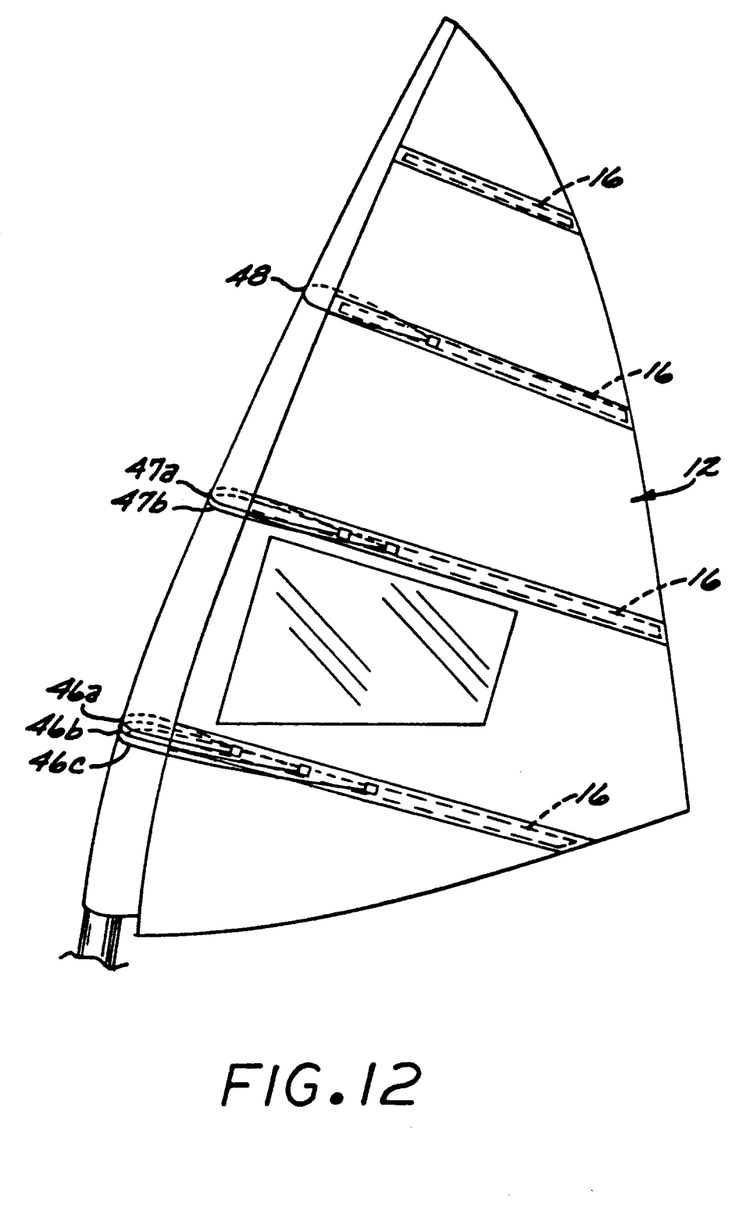
FIG. 12 is a perspective view of a sail incorporating a plurality of the shape controlling device of the present invention.

FIGS. 1 and 12 generally illustrate the flexible wing shape controlling devices of the present invention in the form of tensioning straps as adapted to a sailboard sail. The devices are called upon to impart camber to the sail and serve to maintain such camber at low angles of attack and high airspeeds.

FIG. 1 shows a sail 12 supported by mast 15 accommodated within luff pocket 14. Boom 18 extending about either side of sail 12 is attached at its forward end to the mast by conventional means (not shown) and at its aft end serves to anchor outhaul 19 with which a variable amount of tension is imparted to sail 12. By manipulation of boom 18, the sail's angle of attack is controlled. Stiffening members in the form of battens 16 are incorporated within the sail 12 in batten pockets and generally extend from the leech forward along the sail's chordlines. Window 20 allows an operator to see on both sides of the craft.

Figure 2:
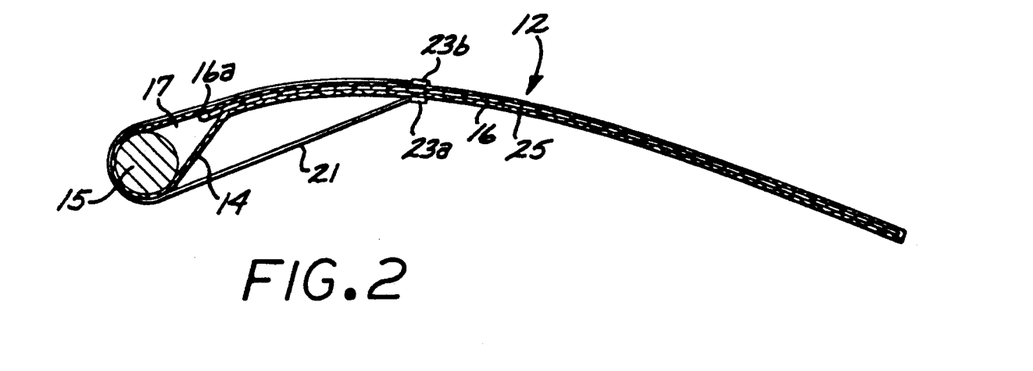
FIG. 2 is an enlarged cross-sectional view taken along lines 2—2 of FIG. 1.

In the sail system illustrated in FIG. 1, three tensioning straps 21(2), 22 are incorporated along three of the battens 16. FIG. 2 is a cross-sectional view of the sail system showing one of the straps. As is apparent in FIG. 2, luff pocket 14 accommodates therein not only mast 15, but camber inducing device 17 as well. The camber inducing device is of the form detailed in applicant's U.S. Pat. No. 4,708,079 which is incorporated herein by reference. Briefly, the camber inducer 17 pivotably interconnects the forward end 16a of batten 16 with mast 15 and prevents the batten from projecting outwardly to disrupt airflow.

The tensioner strap 21 in FIG. 2 comprises the simplest embodiment of the present invention and consists of a strap, looped around mast 15, with both ends thereof securely attached to the sail at points 23a and 23b. Attachment points 23a and b are preferably in juxtaposition to one another and are preferably stitched directly to batten pocket 25 or alternatively affixed directly to the batten. Loads are thereby transferred directly to batten 16 to provide for very direct control of sail shape. The length of strap 21 is selected such that sail material forward of attachment points 23a and b is constrained to a curved configuration, the direction of curvation being determined by wind direction.

Figure 3:
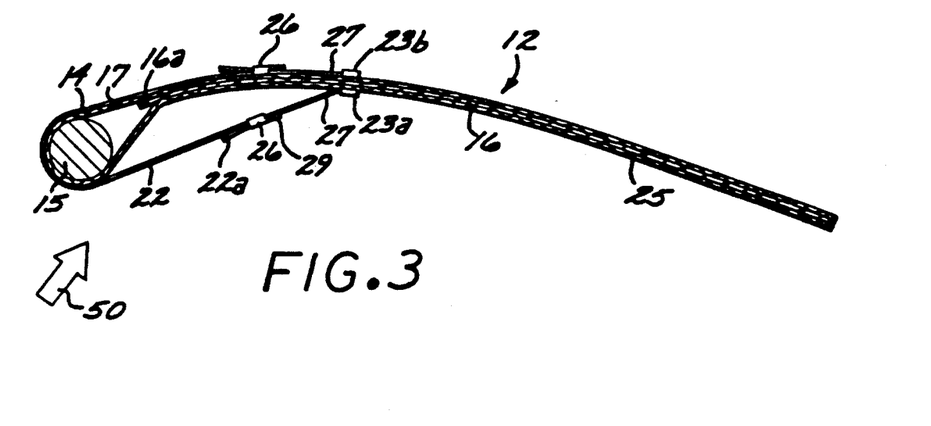
FIG. 3 is an enlarged cross-sectional view taken along lines 3—3 of FIG. 1.

FIG. 3 illustrates an alternative embodiment in which the length of strap 22 is adjustable via two ladder type buckles 26. With the fitment of one buckle on each side of the sail, the strap's total length can either be lengthened or shortened from either side of the sail. Each buckle is attached to the sail via a length of anchoring strap 27 that is preferably stitched directly to batten pocket 25. The buckle functions in conventional manner—twisting the buckle away from the strap by tab 29 releases tension, while pulling on strap end 22a serves to increase tension.

Figure 4:
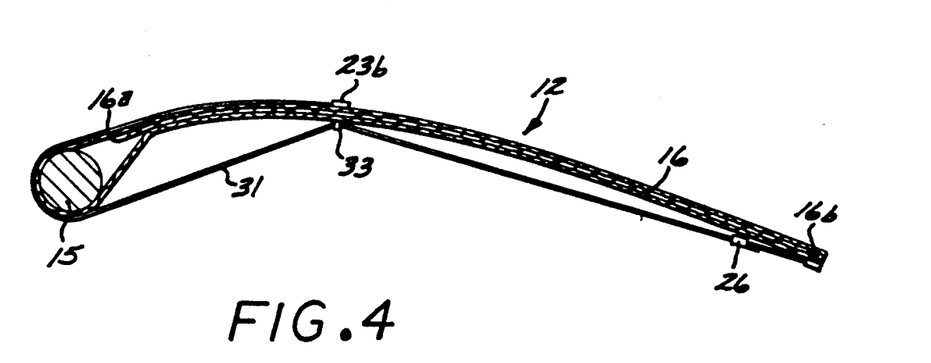
FIG. 4 is a cross-sectional view of a sail showing an alternative embodiment of the shape controlling devices shown in FIGS. 2 and 3.

FIG. 4 illustrates an alternative embodiment in which tensioning strap 32 is routed to near the aft end 16b of batten 16. A ladder type buckle 26 fitted near the aft end allows the strap length to be adjusted at that location. The strap is fed through an eye 33 fitted in the sail's surface which in effect provides an attachment point in the sail at that point, functionally equivalent to stitched attachment point 23b. The strap is then routed aft within batten pocket to emerge therefrom near its interconnection to buckle 26. Only one remote routing and adjustment buckle is shown in this Figure but it should be understood that a similar routing and buckling system can be fitted on both sides of the sail for added convenience.

Figure 5:
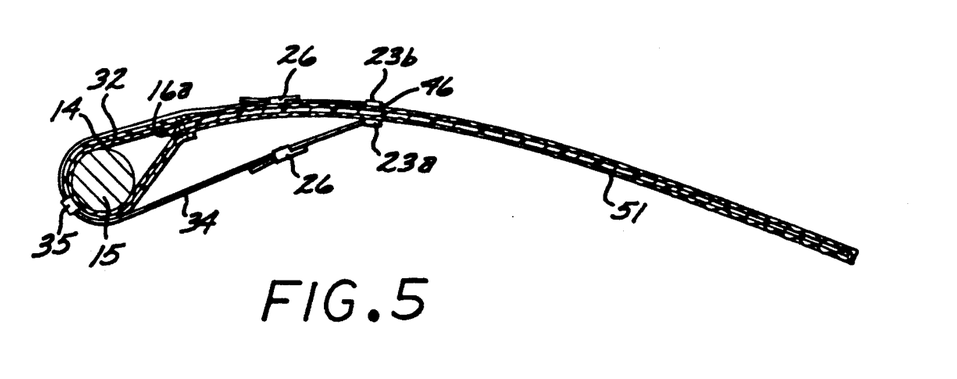
FIG. 5 is a cross sectional view of a sail showing a further alternative embodiment of the shape controlling device of the present invention adapted to an alternative sail design.

FIG. 5 illustrates a tensioning strap of the present invention fitted to a sail system devoid of a camber inducer. In order to control the forward batten end 16a, a relatively stiff plastic shield 32 is fitted about the outside of the luff pocket near each batten end 16a. Additionally, this Figure illustrates an alternative routing of the tensioning strap, wherein strap 34 is attached to the luff at 35 and is routed through the sail and batten at 46. In this particular embodiment, the strap is free to shift position through the sail at 46. It should further be understood, that the strap can fulfill its camber controlling function without being securely affixed at either its forward or aft end, so as to be free to shift from side to side at both ends.

Figure 6:
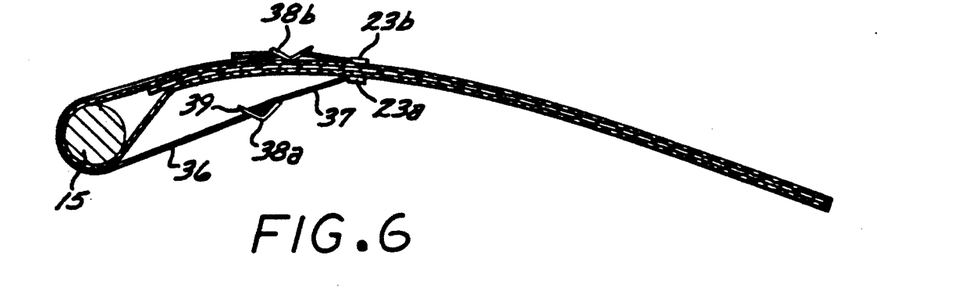
FIG. 6 is a cross-sectional view of a sail showing another alternative embodiment of the shape controlling device of the present invention.

FIG. 6 illustrates a tensioning strap of the present invention fitted with a buckling system that automatically releases with each tack. The strap 36 is routed about the forward side of mast 15 and attached to the sail at points 23a and b. As more clearly shown in FIG. 7, the buckle 38 is attached to anchoring strap 37 at one end and adjustably attached to tensioning strap 36 at its other end. The buckle is angled such that tab ends 29 extend out of the plane defined by straps 36, 37. By mutually pivoting points 40, 42 about one another, the length of strap 36 is effectively shortened as can be seen in FIG. 8a and is maintained in place by virtue of the buckle's over center geometry. A slight application of lateral pressure causes the buckle to move over center and flip to its lengthened position as shown in FIG. 8b. FIG. 6 shows the windward buckle 38a in its shortened position and the leeward buckle 38b in its lengthened position.

Figure 9:
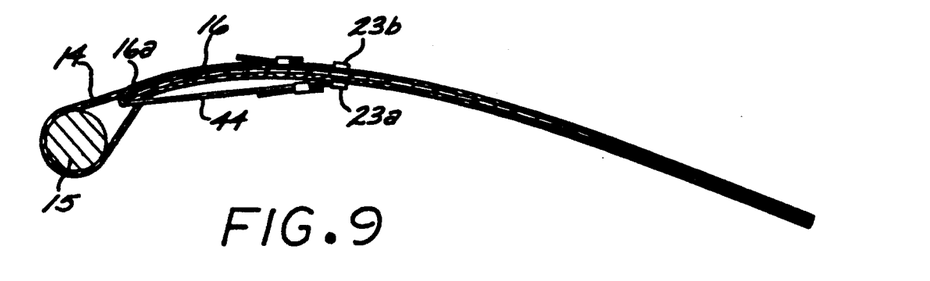
FIG. 9 is a plan view of a sail system to which another alternative embodiment of the invention has been adopted.
Figure 10:
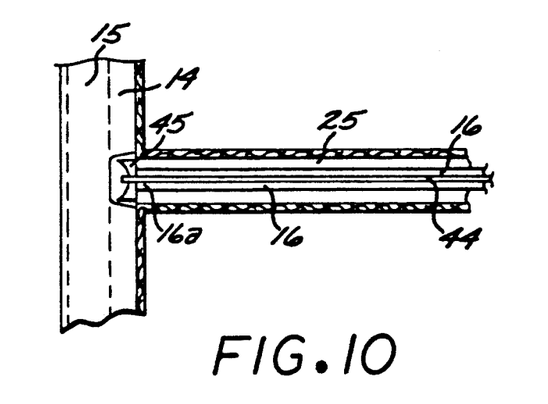
FIG. 10 is a cross-sectional view of the device illustrated in FIG. 9.

FIGS. 9 & 10 illustrate a tensioning system of the present invention adapted to a sail configuration referred to as "RAF" mode (Rotating Asymmetrical Foil) wherein no camber inducer is employed. While the tensioning strap 44 is again attached to the sail at points 23a and b and buckles 26 ar employed for length adjustment, strap 44 is routed around the forward end 16a of batten 16 behind mast 15. A friction reducing guide member 45 fitted to the forward end of the batten maintains strap 44 in alignment with the batten 16 while allowing it to freely shift around the forward end of the batten.

Figure 11:
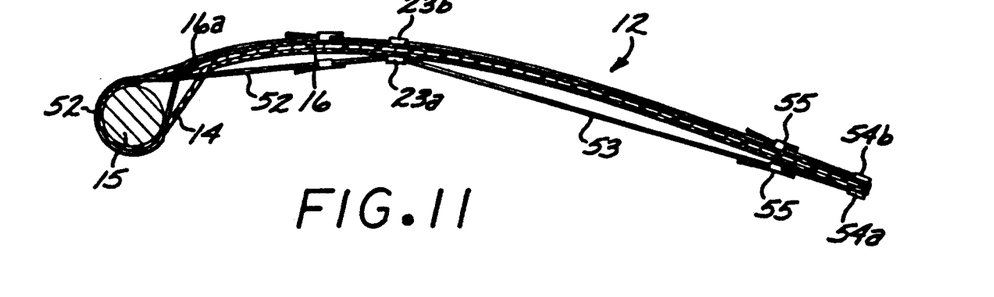
FIG. 11 is a cross-sectional view of a small system incorporating alternative embodiments of the present invention.

FIG. 11 illustrates an alternative embodiment wherein tensioning strap 52 is adapted to an RAF mode sail system in a fashion similar to that described in FIG. 9 but strap 52 is crossed over the forward end 16a of batten 16 and looped around mast 15 and luff pocket 14. A friction reducing material or device is preferably applied to the luff pocket to facilitate the necessary shifting of strap 52 with each tacking maneuver. This Figure further illustrates adaptation of a second tensioning strap 5 for controlling the aft section of sail 12. The forward end of strap 53 is either attached to or passes through the sail near attachment points 23a and b and extends aft to the trailing edge of sail 12 to attachment points 54a and b. Buckles 55 allow the length of strap 55 to be adjusted.

FIG. 12 illustrates sail 12 fitted with a plurality of the tensioning straps 46abc, 47ab, 48 of the present invention both along individual chordlines as well as along the sail's span.

In operation, as air flow impinges on sail 12 from direction 50 shown in FIG. 3, the sail, by virtue of its cut, fills to generally assume an airfoil-like shape. The length of the tensioning strap (21, 22, 34, etc.) employed determines how much curvature is imparted to the forward portion of the sail. The strap freely self-adjusts its position about the mast to accommodate the curvature imparted to the sail, i.e. that portion exposed to the wind will automatically shorten, while its leeward length will increase. The position of attachment points 23a and b, 33 will determine the position of maximum camber while the length of the strap will set the magnitude of maximum camber. The length is adjustable in the embodiments illustrated in FIGS. 3, 4, 5, 6, and 9. The strap serves to maintain camber at higher wind speeds and lower angles of attack by preventing the attachment point from moving aft. This stabilizes the position of the bcp which in turn has a stabilizing effect on the control of the sail and the craft powered thereby.

With a change in wind direction, as a result of a tacking maneuver for example, air impinging from the other side serves to push the sail in the opposite direction. The tensioning strap automatically shifts its position about the mast to effectively shorten its windward length and extend its leeward length. The sail is therefore again constraining to a high camber profile.

Figure 7:
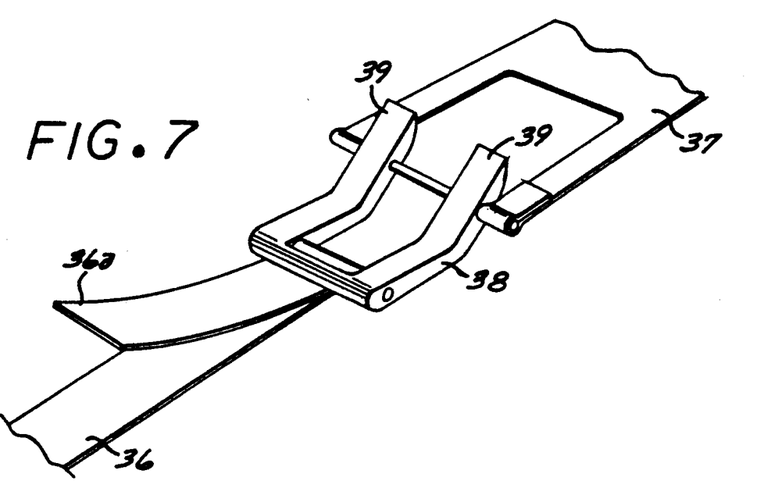
FIG. 7 is an enlarged perspective view of the buckling system shown in FIG. 6.
Figure 8A:
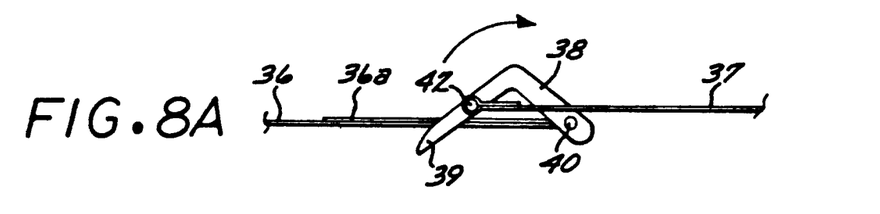
FIGS. 8a and 8b are plan views of the buckling system shown in FIG. 7 in its tensioned and released configuration.
Figure 8B:
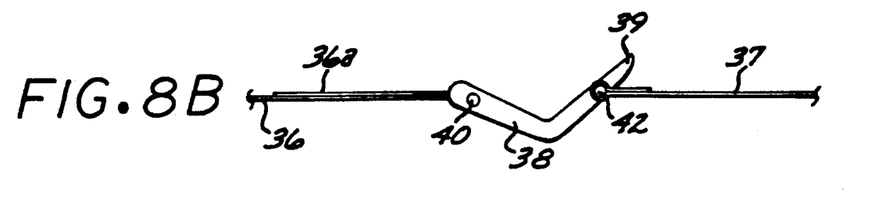

The buckling system illustrated in FIGS. 6–8 serves to automatically release tension in strap 36 with each tack. As the sail fills toward the leeward, the sail material pushes on the elongated tab 39 of a buckle in the position shown in FIG. 8a to push the device over center and thereby cause it to flip over for an increase in strap length. The operator having shifted to the windward is then free to reset the windward buckle if so desired.

It has additionally been found that the strap of the present invention offers an advantage in high wind conditions that would otherwise overpower the sail. As shown in FIG. 5, the trailing section 51 of sail 12 is free to "reflex" and thereby dump power, yet the forward section maintains shape to minimize any shifting of the bcp. This allows a sailor to continue sailing under adverse conditions at desired pointing angles and prevents blow over when a sudden gust takes the sailor by surprise.

The configuration illustrated in FIG. 12 provides maximum adjustability to the sail shape. The straps 46a, b, c disposed along a common chordline allow the shape of the sail to be fine tuned along its entire chord, while a differential adjustment of for example straps 46a, 47a, 48 disposed along the sail's span allow the twist of the sail to be modifying and maintained under various conditions.

EXAMPLE

A six square meter sailboard sail was fitted the tensioning straps of the present invention in the form of webbing looped about the mast and luff pocket in the configuration illustrated in FIG. 3. Two straps were fitted one at 40% and the other at about 50% of the sail height while attachment points 23a and b were located at position 33% aft of the leading edge. The sail was subjected to various airflow velocities at various angles of attack and the positions of the bcp and scp were measured.

Figure 13:
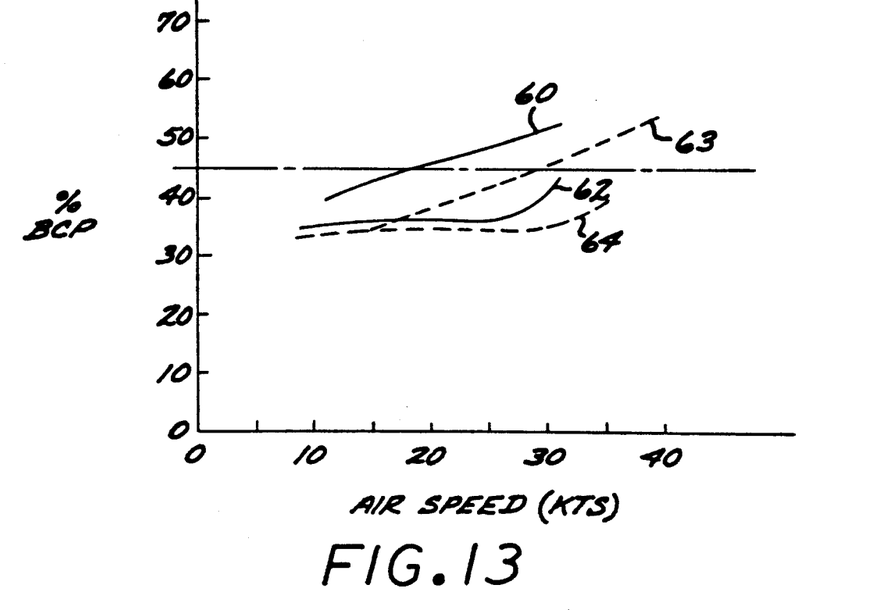
FIGS. 13-15 plot various performance parameters of sails with and without benefit of the tensioning strap of the present invention.

FIG. 13 illustrates the movement of bcp along the boom as measured in percentage of the sail's length aft of its leading edge. Lines 60 and 62 illustrate the effect of the strap at an angle of attack of 8°. Line 60 shows that without benefit of the strap (buckle released) the bcp quickly moves aft as airspeed increases. It has been found that a bcp beyond 45% destabilizes the sail to the point of unmanageability and the sail effectively becomes overpowered.

As is apparent in FIG. 13, at an 8° angle of attack, without benefit of the tensioning strap, the sail is overpowered at 18 kts. The same sail, at an 8° angle of attack, with the strap tensioned is shown as line 63 wherein the sail is overpowered at about 28 kts, a substantial increase in the range of airspeed this sail is capable of handling. Line 62 and 64 illustrate the same effect at a larger angle of attack of 19°. Again, without the strap (line 62) the sail is over powered much sooner than with the strap tensioned (line 64).

Figure 14:
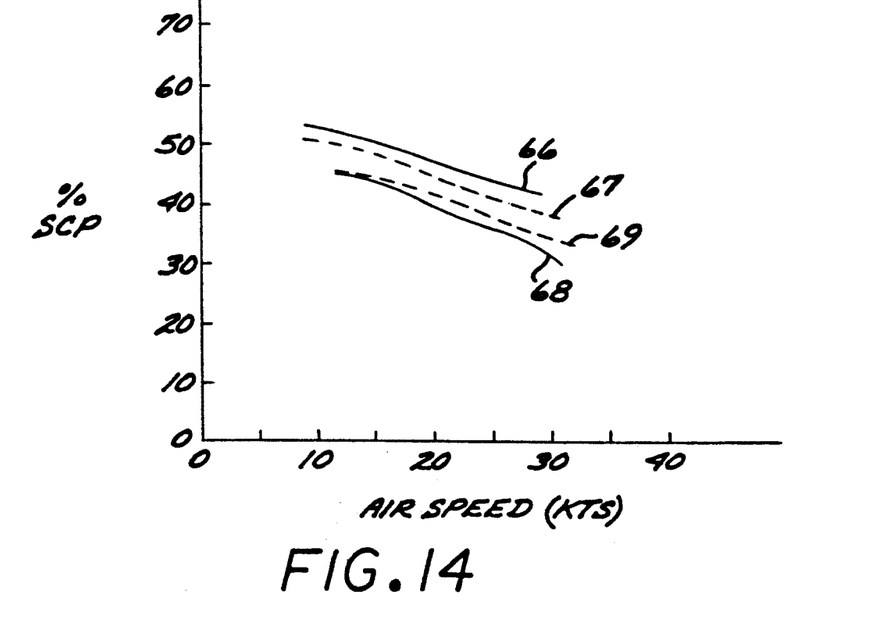

In FIG. 14 the position of the scp is plotted as a function of airspeed with 100% corresponding to the sail's head. At an 8° angle of attack, the downward shift is shown without benefit of the strap (line 66) and with the strap tensioned (line 67). Lines 68 and lines 69 demonstrate a similar downward shift at a 19° angle of attack with strap (line 69) and without strap (line 68). The graph illustrates the stabilizing effect of the presence of the strap, as the sail with the strap tensioned undergoes a much smaller shift in scp with a change in angle of attack that the sail not having benefit of the strap of the present invention. This yields a much more manageable sail system.

Figure 15:
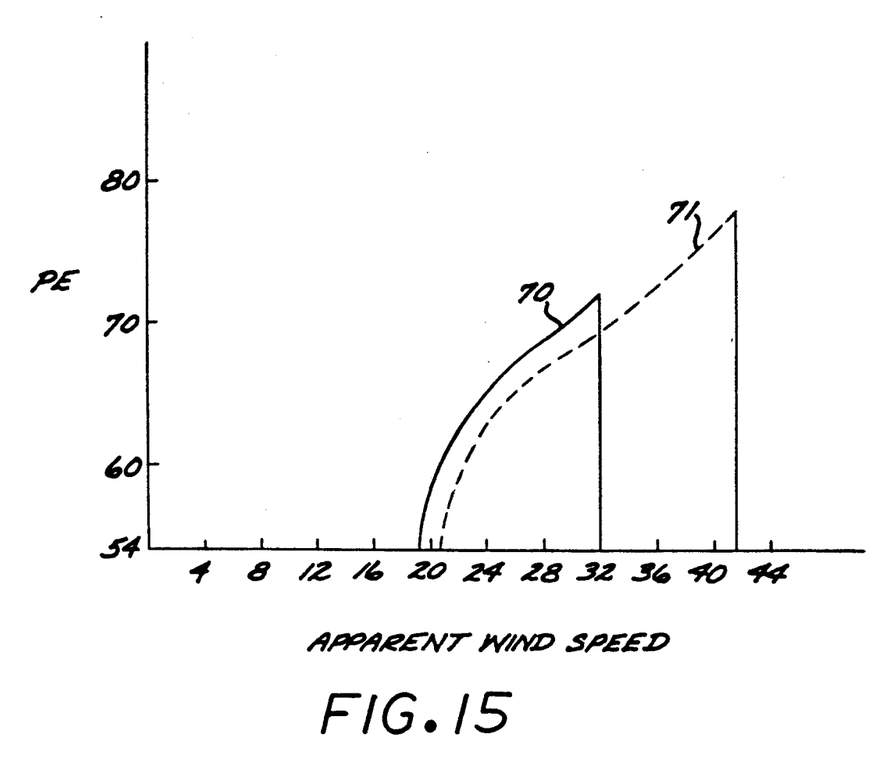

FIG. 15 plots the sail's PE (power efficiency index) versus apparent wind speed and is an indication of how much driving force the sailor can convert from the amount of force held at the boom. The lower the scp the more useable the wind's power is. For example, a 70% PE index means that 70 lbs. of driving force can be derived from a 100 lb. effort at the boom. The abrupt cut off correlates to the 45% bcp limit. The figure arbitrarily illustrates the described above effect of 185 lbs. of force held at the boom and shows how a sail with benefit of a tensioner strap (line 70) has a substantially higher limit (41.6 kts) than a sail without benefit of the strap (line 71—19 kts). By selectively tensioning and releasing the strap's tension, advantage can be taken of the increased efficiency apparent in FIG. 15 at lower speeds without the strap and at higher speeds with the strap.

Figure 16:
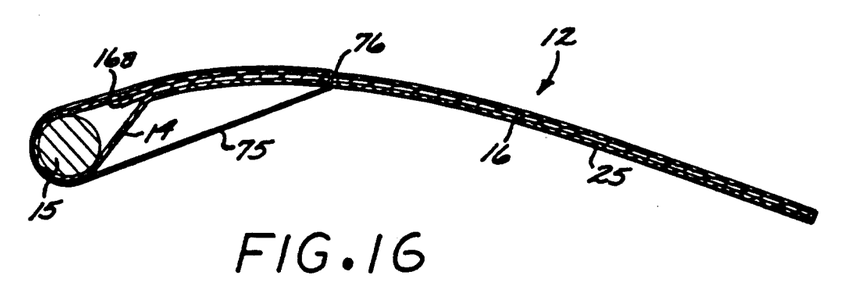
FIGS. 16 and 17 are cross-sectional views of a sail showing alternative embodiments of the shape controlling device according to the present invention.

FIG. 16 illustrates an alternative embodiment wherein the tensioning strap 75 comprises a closed loop that passes about the mast 15 and through the sail, i.e. batten pocket 25 and batten 16 at 76. Both ends of the strap are therefore free to shift or circulate rendering sail rotation easier during a tacking maneuver.

Figure 17:
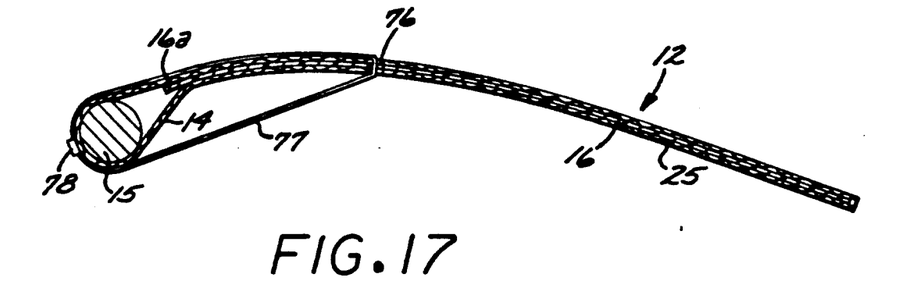

With reference to FIG. 17, it is also possible to fixedly secure the front portion of the strap 77 as by stitching 78 to the mast and allow the rear portion thereof to shift relative to the batten by sliding through aligned openings 76 extending through the sail and batten.

Figure 18:
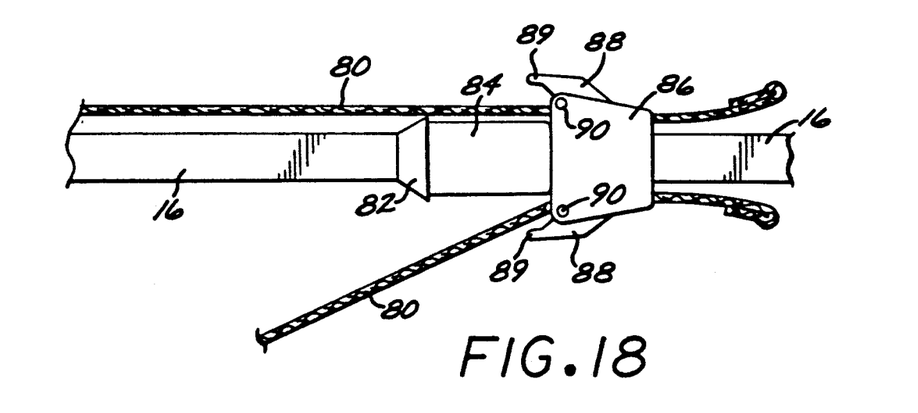
FIG. 18 is an enlarged top plan view of a tensioning strap attachment system.

FIG. 18 illustrates a preferred tensioning strap attachment system. The system serves to attach the tensioning strap 80 to batten 16, allows the strap length to be adjusted from both sides of the sail and provides for tension relief which is an especially advantageous feature during sail rotation. Collar 82 is rigidly or alternatively adjustably affixed to batten 16 while connector 86 is free to slide along the batten. Jam cleats 88, integrated into connector 86, serve to hold both ends of tensioning strap 80 in position relative connector 86. Depressing lever end 89 of the cleat immediately releases tension. Conversely, releasing the lever causes strap 80 to draw the cleat inwardly about pivot point 90 to automatically set and maintain a desired strap length. Positioned between collar 82 and connector 86 is compressible fitting 84. The fitting is formed of a length of rubber hose, or alternatively comprises a compression spring or a polyurethane component. The small amount of movement upon compression of fitting 84 serves to relieve stress to facilitate sail rotation and to reduce undesirable shock loads.

Stress relief is alternatively achieved in systems such as illustrated in FIGS. 2-6, 9, 11, 16, and 17 by incorporating a short length of shock cord in the tensioning strap which is otherwise formed of webbing or braided line. A one inch length of urethane cord such as is used for surfboard leashes has been found effective to adequately relieve the peak stresses.

While a particular form of the invention has been illustrated and described, it will also be apparent to those skilled in the art that various modifications can be made without departing from the spirit and scope of the invention. Accordingly, it is not intended that the invention be limited except as by the appended claims.

What is claimed is:

1. A tensioning device for automatically controlling the shape of a said extending rearwardly from a mast when the said is exposed to an airflow, the said having a windward surface and a leeward surface, and the sail being provided with a horizontally extending batten, said tensioning device comprising:

a freely self-adjusting strap looped about the leading edge portion of the sail and extending horizontally rearwardly from such leading edge portion along the opposite surfaces of the sail in alignment with the batten to a preselected point on the sail, with the strap portion on the windward surface of the sail extending under tension in a straight line from the leading edge portion of the sail to said preselected point on the windward surface of the sail whereby the tensioned portion of the strap directly imparts a preselected amount of camber to the shape of the batten and hence to the sail; and wherein the strap is free to shift independently relative to the sail to automatically increase the length of the strap portion disposed on the leeward surface of the sail when the strap portion extending over the windward surface of the sail is under tension.

2. The device of claim 1, wherein an adjustment means is incorporated in said strap to selectively vary its length.

3. The device of claim 1, wherein a plurality of adjustment means are incorporated in said strap, one disposed adjacent each sail surface.

4. The device of claim 1, wherein said strap is directly attached to said batten member at said preselected point.

5. The device of claim 1, wherein the front part of said strap is shiftable relative to the leading edge portion of the sail and the rear part of the strap is fixed relative to the sail.

6. The device of claim 1, wherein the front part of said strap is fixedly connected to the mast and the rear part of said strap is shiftable relative to the sail.

7. The device of claim 1, wherein the front part of said strap is shiftably relative to the leading edge of the sail and the rear part of the strap is also shiftable relative to the sail.

8. The device of claim 1, wherein the front end of the strap is looped about the front end of the batten.

9. The device of claim 1, wherein a plurality of said straps are each looped about the leading edge portion of the sail, each strap extending to a different preselected point along the chord of the sail.

10. The device of claim 6, wherein the rear part of the strap slidably extends through the batten.

* * * * *

UNITED STATES PATENT AND TRADEMARK OFFICE
CERTIFICATE OF CORRECTION

PATENT NO. : 5,275,117
DATED : January 4, 1994
INVENTOR(S) : Jeffrey J. Magnan

It is certified that error appears in the above-indentified patent and that said Letters Patent is hereby corrected as shown below:

Column 4, line 18, delete small, and replace with sail;
Column 6, line 4, delete ar, and replace with are;
Column 6, line 20, delete 5, and replace with 53;
Column 8, line 55, delete said, and replace with sail; and
Column 8, line 56, delete said, and replace with sail.

Signed and Sealed this

Seventh Day of June, 1994

Attest:

BRUCE LEHMAN

*Attesting Officer*  *Commissioner of Patents and Trademarks*